INVENTOR.
ROBERT J. PRICE
BY Carl R. Brown
attorney

Sept. 5, 1967 R. J. PRICE 3,339,652
LOAD WEIGHT INDICATOR INSTALLATION FOR
CRANES, DERRICKS AND THE LIKE
Filed Sept. 26, 1966 2 Sheets-Sheet 2

INVENTOR.
ROBERT J. PRICE
BY Carl R. Brown
Attorney

United States Patent Office 3,339,652
Patented Sept. 5, 1967

3,339,652
LOAD WEIGHT INDICATOR INSTALLATION FOR CRANES, DERRICKS AND THE LIKE
Robert J. Price, 1311 Hacienda, El Cajon, Calif. 92020
Filed Sept. 26, 1966, Ser. No. 582,153
9 Claims. (Cl. 177—136)

This invention pertains to a load weight indicator installation and more particularly to a load weight indicator installation for cranes, derricks and the like in which a load cell for measuring the weight of loads handled by the cranes, derricks and the like is mounted on the boom in a manner that achieves a high degree of accuracy in weighing the loads handled.

Load cells are used to measure the weight of loads handled by cranes, derricks and the like. These load cells are installed on the boom or in the cable system in many different forms of installation. For example, the load cells may be installed in the length of cable running from the top sheave to the load lifting device, or the load cell may be installed on the sheave block itself, or in other installations the load cell may be installed in various cable arrangements at locations removed from the end of the boom. The object of these installations are to achieve an accurate loading on the load cell that may be transmitted to a readout device, the combination of which forms a crane scale.

These known load cell installations have several limitations. When the load cell is mounted in the cables directly above the lifting device, which may be a magnet, the load cell is usually able to read the weight lifted by the lifting device. However in this installation the load cell is subject to considerable shock and strain that is transmitted from the lifting device. So to obtain an installation in which there is less shock on the load cell, the load cell is sometimes placed on the sheave block itself. In the sheave block installation, it is difficult to allow for side forces and bearing friction that contribute to inaccurate weight readings. In still other installations, the load cell may be placed in a combination cable and sheave installation that is out of the direct cable support between the upper sheave block and the lifting device. In the latter installation, the load cell responds to a load that is different from that actually lifted and the load cell reading must then be adjusted to determine the actual weight lifted. Because of bearing friction in various sheaves used and also because of the angles and force moments involved, it is very difficult to obtain anything more than an approximation of the weight lifted. Thus in the known installations, the load cells are either subject to shock or twisting forces that will damage the load cell or cause it to give inaccurate readings, or the load cell is subject to angles, force moments and friction which are difficult to compute. The previously mentioned installations only give close approximations of the weight of the load lifted.

It would thus be an improvement in the art to provide a load cell installation that is removed as much as possible from the immediate shock forces imparted on the lifting device, that is capable of reading the correct vertical load on the lifting device, that is not in the cable system and that substantially eliminates the side force moments on the upper sheave.

It is therefore an object of this invention to provide a new and improved load weight indicator installation for cranes, derricks and the like.

It is another object of this invention to provide a new and improved load weight indicator installation for cranes, derricks, and the like in which the horizontal and vertical force components on the upper sheave are separated and the load cell is in a position to read substantially the vertical force resulting from the load.

It is another object of this invention to provide a new and improved load weight indicator installation for cranes, derricks and the like in which cable handling problems are reduced or eliminated.

It is another object of this invention to provide a new and improved accurate load weight indicator installation for cranes, derricks and the like in which the number of sheaves between the load cell and the lifted load is reduced.

It is another object of this invention to provide a new and improved load weight indicator installation for cranes, derricks and the like in which direct shock on the load cell is reduced.

It is another object of this invention to provide a new and improved load weight indicator installation for cranes, derricks and the like that is capable of providing increased accuracy in establishing the weight of the loads handled.

It is another object of this invention to provide a new and improved load weight indicator installation for cranes, derricks and the like in which a load cell directly supports the load lifted.

It is another object of this invention to provide a new and improved load weight indicator installation for cranes, derricks and the like in which the load cell installation will be maintained at a given angular relationship between the upper sheave and the cable leaving the upper sheave.

It is another object of this invention to provide a load weight indicator installation for cranes, derricks and the like in which the position of the load cell may be selectively varied in a manner that the cable leading to the upper sheave is maintained at a substantially horizontal angle to the upper sheave.

In my invention I accomplish the foregoing objects by positioning a pair of sheave means in a substantially horizontal and spaced relationship one from the other. One of the sheave means carries the cable that is connected to the lifting device and is directly positioned over the lifting device. The other sheave means receives the cable from the winch or the like and supplies the cable to the first sheave means in a substantially horizontal plane. A load cell installation is provided for supporting the weight of the first sheave means, the cable and lifting device, the load lifted. A rigid extension is placed between the pair of sheave means for maintaining the horizontal distance there between. Thus the first sheave means is subjected to only the vertical lifting force required to lift the cable, the lifting device and the load lifted. The load cell in supporting the first sheave means supports the latter weight and is not subjected to the lateral forces, such as the pulling force on the first sheave means by the cable that passes over the other horizontally positioned sheave means.

The particular structural installation to accomplish my invention may take any of several forms. For example, the horizontally positioned pair of sheave means may be located at some point along the length of the boom. The load cell is supported by a cable or the like on the end of the boom above the sheave means and at a vertical position above the first sheave means. The cable supporting the load cell also supports in line there with the first sheave means and thus vertically supports the load lifted. In this installation, it is also a part of my invention to make the upper end of the boom pivotable around the point of support of the other sheave means on the boom structure. Thus with raising and lowering of the boom, it is possible to pivot the upper extension of the boom that supports the load cell in a manner to maintain the first sheave means in a horizontal position relative to the other sheave means and further to maintain the load cell in vertical alignment with the first sheave means. In this latter embodiment of my invention a second cable system is utilized to move the upper end of the boom to different positions as desired.

In another embodiment, the other sheave means is positioned on the end of another member that is pivotally supported at a point along the length of the boom. The first sheave means comprises a sheave block or weighing block having a load cell therein that directly supports the sheave in the sheave block. The sheave block is supported by a support means directly attached to the extension of the boom above the first sheave means so that the sheave is suspended vertically from the boom. Thus in raising and lowering of the end of the boom it is possible to selectively move the other sheave means vertically to maintain a horizontal relationship between the pair of sheave means. It is also possible to maintain a vertical force on the load cell supporting the first sheave means and to eliminate lateral forces on the sheave means and the load cell.

Thus with a totalizing load weight indicator, installations of my invention provides an accurate total of the loads handled over any desired period of time by the cranes, derricks and the like. The unique installation of the load cell eliminates problems in handling load cell cables, protecting the load cell from damage, and at the same time provides an accurate loading on the cell that results in a high degree of accuracy for a crane scale.

These and other features, advantages, and objects of my invention will be better understood from the description of several of its embodiments together with the associated drawings, and the scope of the invention will be more particularly pointed out in the appended claims.

Figures 1, 2:
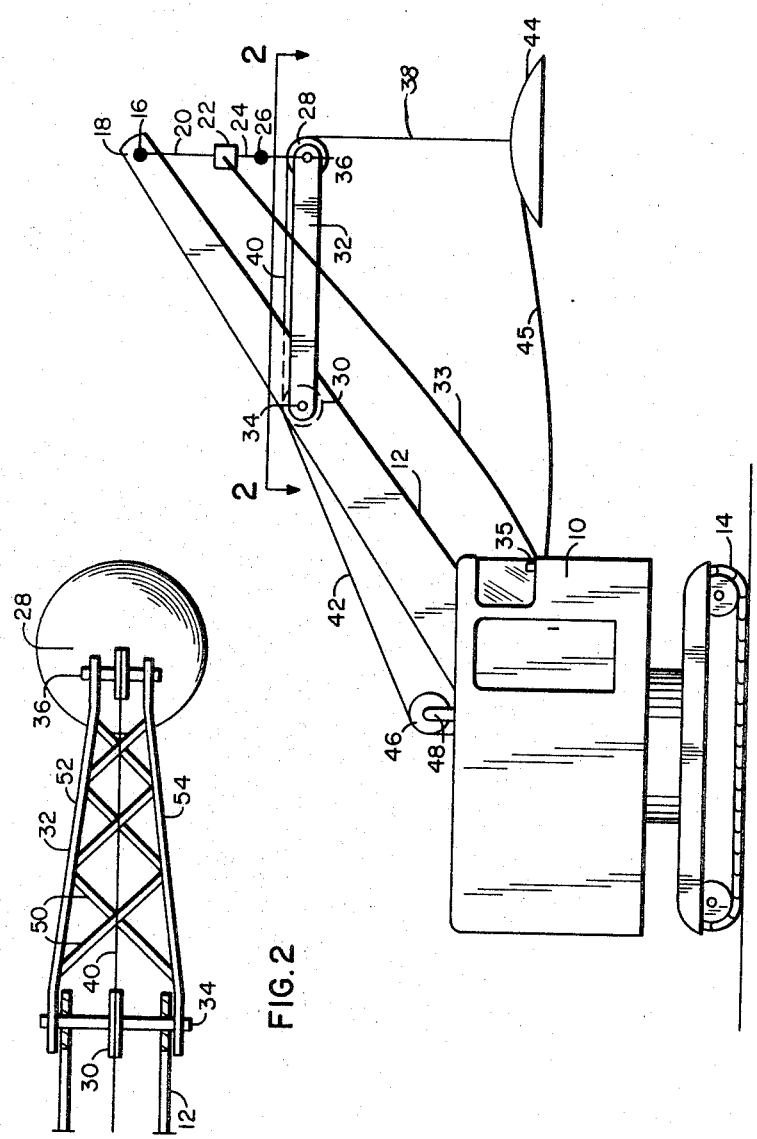
FIGURE 1 is a side view of a schematic illustration of an embodiment of my invention.
FIGURE 2 is a partial view taken along lines 2—2 of FIGURE 1 in the directions of the arrows.

Referring now to FIGURE 1, a crane 10 having a mobile support 14 supports a boom structure 12 in the known manner. A sheave means 30 is secured by boom 12 for carrying a cable 42. The cable 42 is released or retracted by a winch 46 mounted by a known mounting bracket 48 on the crane 10. The operation of the winch 46 is controlled in the well known manner by an operator in the crane. Another sheave means 28 is positioned horizontally with the other sheave means 30 and is supported in this position by a cable, rod or the like by a pivotal attachment 16 to the upper end 18 of the boom 12. The sheave means 30 (see FIGURE 2) is supported by an axle 34 between side members of the boom 12. The boom 12 may have any of the various known structural designs, such as a rectangular in section structure with appropriate internal bracing. Also mounted on shaft 34 is a longitudinal rigid extension 32 having side members 52 and 54 and internal bracing 50. The side members of the longitudinal extension 32 are pivotally supported on the boom 12 and a sheave means 28 is rotatably supported on the other end 36 of extension 32. Sheave means 28 may move vertically but cannot move horizontally either toward or away from sheave means 30.

A load cell 22 of any known design, such as a strain gauge or a hydraulic cell is supported by a cable or rod 20. A line means 33 such as an electrical conductor carries information from the load cell to a readout mechanism 35 having an indicator or recorder in the cab of the crane 10. The load cell is supported at 16 by a spherical bearing or the like and has a spherical bearing or the like 26 in the cable or rod 24. These bearings prevent any twisting moments being placed on the load cell 22. In addition the extension structure 32 with its rigid supports 50 prevents any twisting of the sheave means 28 during raising or lowering of the lifting device 44. The lifting device 44 of the embodiment shown is as an electro-magnet that is controlled through line 45 by the operator in the cab of the crane 10.

In operation of the embodiment shown in FIGURE 1, the cable 42 is moved by the winch 46 under the control of the crane operator. The lifting device 44 is dropped onto an object to be lifted and the winch 46 is then operated to pull the cable 42. Cable 42 passes over sheave means 30 and has a horizontal section 40 leading to the sheave means 28 where the next section of the cable 38 drops substantially vertical to the lifting device 44. It may thus be seen that any horizontal moment on sheave means 28 due to the drawing of the cable 42 and section 40 is substantially eliminated by the rigid extension 32. Thus only the vertical weight moment is supported by the load cell 22 in supporting the sheave means 28, cable 38, lifting device 44, that portion of the longitudinal extension 32, and the load. Thus there is a direct weight relationship between the load carried and the reading of the load cell device 22. It can also be observed that shock forces originating in the lifting device 44 are not transmitted through the load cell 22 and also load cell 22 is not in the cable system.

Figure 3:
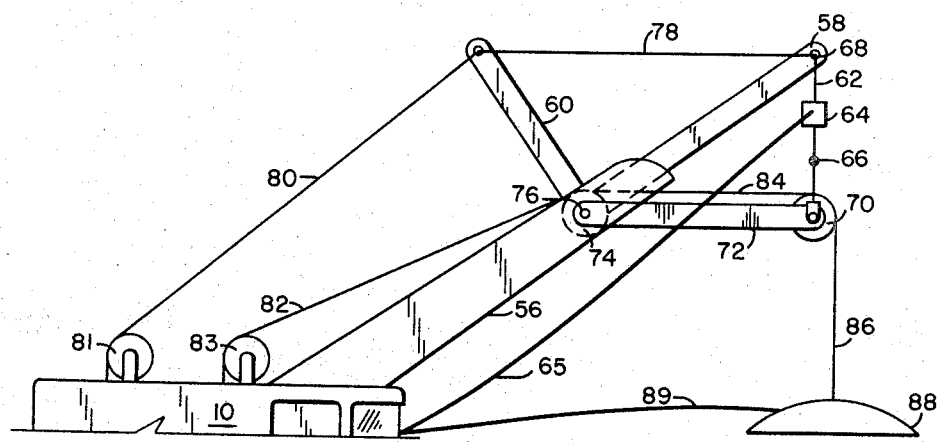
FIGURE 3 is a schematic illustration of a modified form of my invention.

Referring now to FIGURE 3, the pair of sheave means 70 and 74 are positioned in a horizontal arrangement and a longitudinal device 72, corresponding to the longitudinal extension device 32 of FIGURES 1 and 2, is positioned between the sheave means. In this modified embodiment, the load cell 64 and supporting cables or rods 62 are supported on the end of a member 58 that is pivotally supported on the end of the boom 56 and pivots around the point of the shaft 76 which supports the sheave means 74. A second member 60 is also pivotally mounted on the boom 56 for pivotal rotation around shaft 76. A length of cable 78 is connected between the ends of the members 58 and 60. A cable 80 is secured to the end of extension 60 and is moved by winch 81.

In operation, the winch 83 pulls cable 82 over the sheave means 74 and 70 to lift the lifting device 88 and the load that may be secured thereto. When it is necessary to raise the end of the boom 56, this will, of course, raise the end of the extension 58 and accordingly raise the sheave means 70. Accordingly sheave means 70 and 74 will no longer have a horizontal relationship and, in addition, the load cell supporting structure 62 will no longer be vertical. The operator of the crane, to correct this situation, will operate winch 81, releasing a portion of cable 80 that will allow extension 58 to rotate in a clockwise direction. This will return extension means 72 to a horizontal position and again returning the load cell linkage 62 to a vertical position. The embodiment in FIGURE 3 then continues to function to allow the load cell to read the weight lifted by the lifting device 88 in the manner previously described in connection with FIGURE 1.

Figure 4:
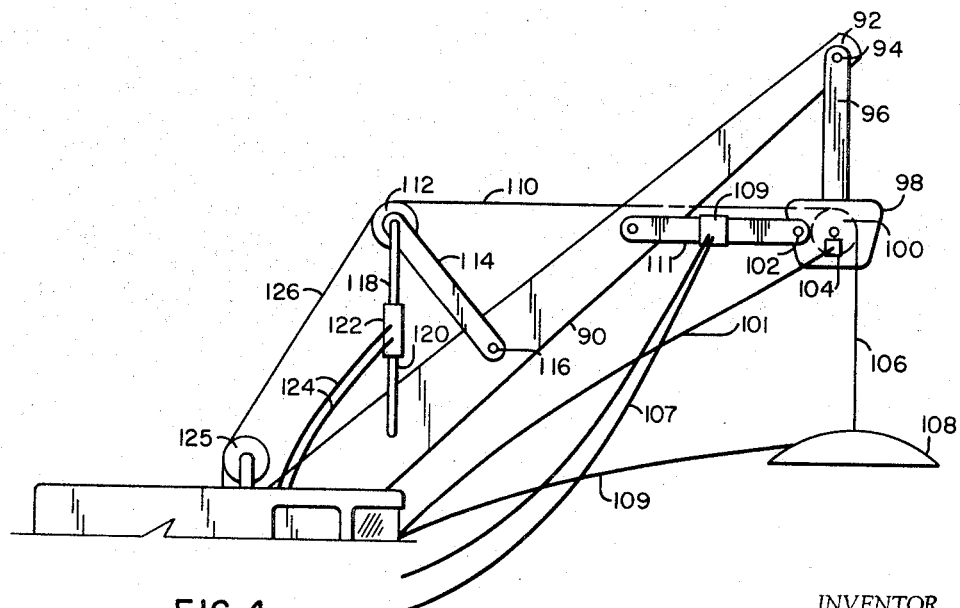
FIGURE 4 is a schematic illustration of still another modification of my invention.

Referring now to the embodiment disclosed in FIGURE 4, the pair of sheave means 100 and 112 are again mounted in a horizontal arrangement. The sheave means 100 shown in phantom in sheave block 98, is supported by a load cell 100 in a well known standard weighing block construction. This weighing block provides for lateral support of the load cell so that the load cell weighs the vertical weight of the sheave 100 and the load carried by the sheave 100 which the load cell 104 supports. Line 101 carries the information from the load cell to the cab of the crane. A structural link 111 is connected between the standard weight block and the boom 90 to prevent movement of the standard weight block 98 toward the boom 90 upon pulling the horizontal section of the cable 110. The standard weight block is supported by a linkage, cable or the like 96 on a pivotal support on the end 92 of the boom 90.

The other sheave means 112 is pivotally supported on the end of an extension 114 that is pivotally supported at 116 on the boom 90. A supporting rod structure has rods 118 and 120 that are connected between the end of extension 114 and the boom 90 and supports the extension structure 114 in its projected position. An extension and retraction device 122, such as for instance a well known hydraulic mechanism controlled by fluid conduits 122 and 124, is capable of extending or shortening the composite length of the rods 118 and 120 as desired. A similar extension device 102 is positioned in link 111.

In operation of the embodiment shown in FIGURE 4, the operator energizes the winch 125 to move the cable 126, 110 and 106 to lift the lifting device 108 in the normal manner. When the crane operator wants to move the boom 90 vertically upwardly to a steeper angle of projection, then linkage 96 is no longer vertical and link 111 is no longer horizontal. Accordingly it is necessary for the operator to extend composite length of rods 118 and 120 by control of the hydraulic fluid in the hydraulic extension mechanism 122. This rotates extension 114 around its pivotal support 116 an amount necessary to raise the height of the sheave means 112 to a point where it is again substantially horizontal with sheave means 100. Also the operator controls the hydraulic fluid in extension mechanism 102 to shorten the length of link 111, thereby returning the supporting linkage 96 and the sheave block 98 to a vertical position. The operator then continues to operate the winch 125 to lift loads in the normal manner.

From the foregoing description it will be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

What I claim is:

1. A load weight indicator installation for cranes, derricks, and the like comprising,
   a boom for carrying a load,
   cable means for lifting said load,
   sheave means positioned directly above said load for carrying a portion of said cable means and said load,
   weighing means for vertically supporting said sheave means,
   suspension means for suspending said weighing means from said boom,
   and positioning means cooperating with said cable means and interconnected between said boom and said sheave means for substantially eliminating all but the vertical force component on said sheave means when said load is lifted.

2. A load weight indicator installation as claimed in claim 1 wherein,
   said positioning means including at least a second sheave means beng supported by said boom at a spaced position from and in the same horizontal plane with said sheave means for carrying cable in said cable means to said sheave means in said horizontal plane.

3. A load weight indicator installation as claimed in claim 2 wherein,
   said positioning means includes horizontal rigid means being interconnected between said sheave means and said boom for rigidly spacing said sheave means and said second sheave means.

4. A load weight indicator installation as claimed in claim 3 wherein,
   said rigid means has bracing structure for preventing twisting of said sheave means,
   said weighing means comprises a load cell,
   and rotatable means in said suspension means for substantially eliminating twisting forces on said load cell.

5. A load weight indicator installation as claimed in claim 3 wherein,
   said rigid means and said suspension means intersect at a substantially normal angle.

6. A load weight indicator installation as claimed in claim 5 in which the end of said boom is capable of being raised or lowered,
   said second sheave means being fixed to the end of said boom,
   the end of said boom having a pivotal member for supporting said suspension means at the end thereof,
   and adjusting means for adjusting the pivotal position of said pivotal member upon raising or lowering the end of said boom to maintain said normal angle between said suspension means and said rigid means.

7. A load weight indicator installation as claimed in claim 6 wherein,
   said adjusting means includes a second member pivotally secured to said boom,
   means interconnecting the ends of said member and said second member for moving said member upon movement of said second member,
   and means for selectively pivoting said second member.

8. A load weight indicator installation as claimed in claim 5 wherein,
   said sheave means comprises a weighing block.

9. A load weight indicator installation as claimed in claim 8 including,
   means for selectively extending or shortening the length of said rigid means,
   extension means pivotally connected to said boom for supporting said second sheave means on the end thereof,
   rod means for positioning the pivotal position of said extension means relative to said boom,
   and means for selectively extending or shortening the length of said rod means.

References Cited

UNITED STATES PATENTS

| 1,555,239 | 9/1925 | Essman | 177—136 X |
| 1,967,622 | 7/1934 | Louvier | 177—147 |
| 2,646,273 | 7/1953 | Wetsel | 177—147 |
| 3,186,504 | 6/1965 | Van Wilgen | 177—210 |

FOREIGN PATENTS

| 225,705 | 12/1924 | Great Britain. |

RICHARD B. WILKINSON, *Primary Examiner.*

G. H. MILLER, *Assistant Examiner.*